United States Patent Office 3,310,991
Patented Mar. 28, 1967

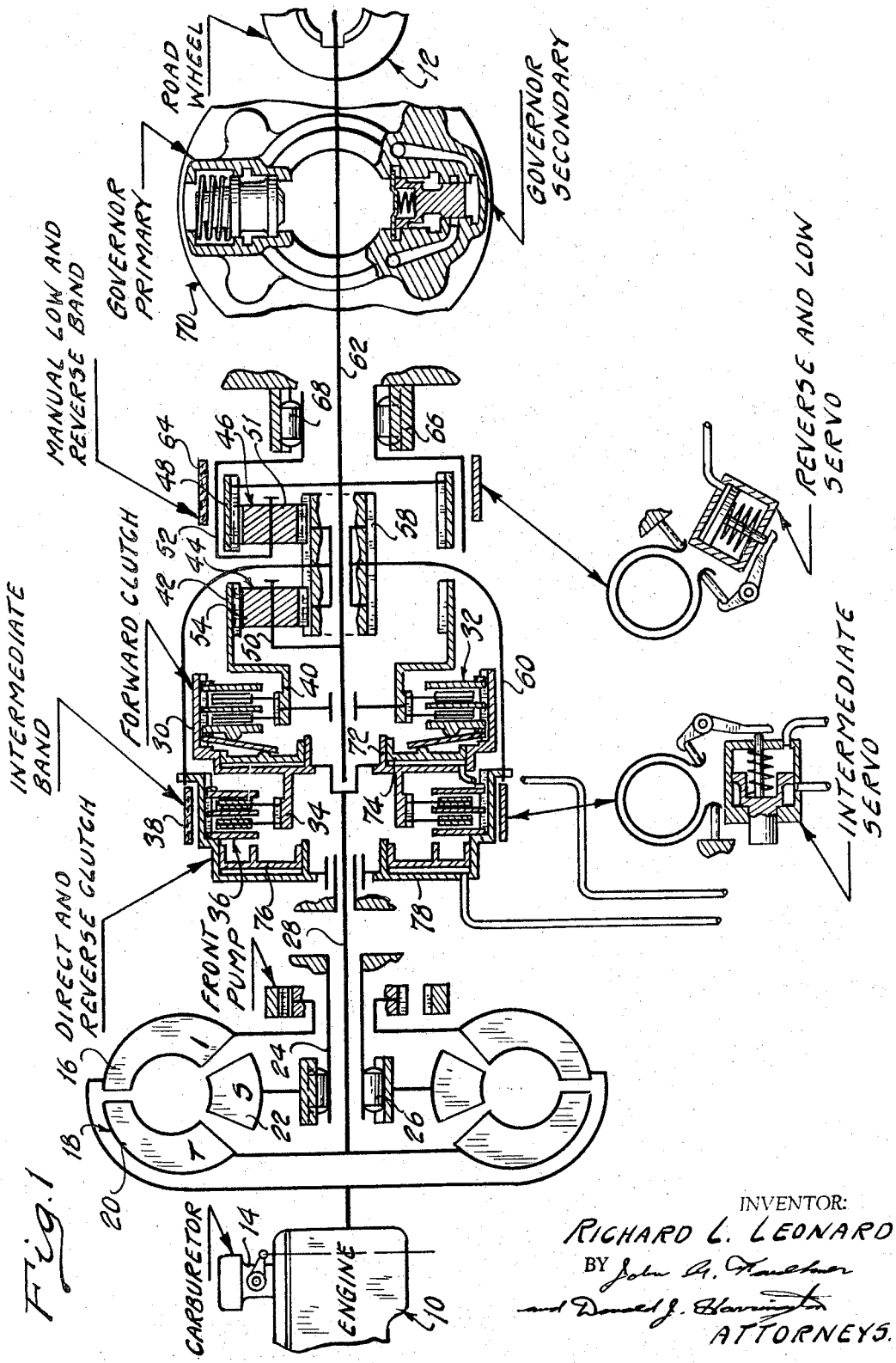

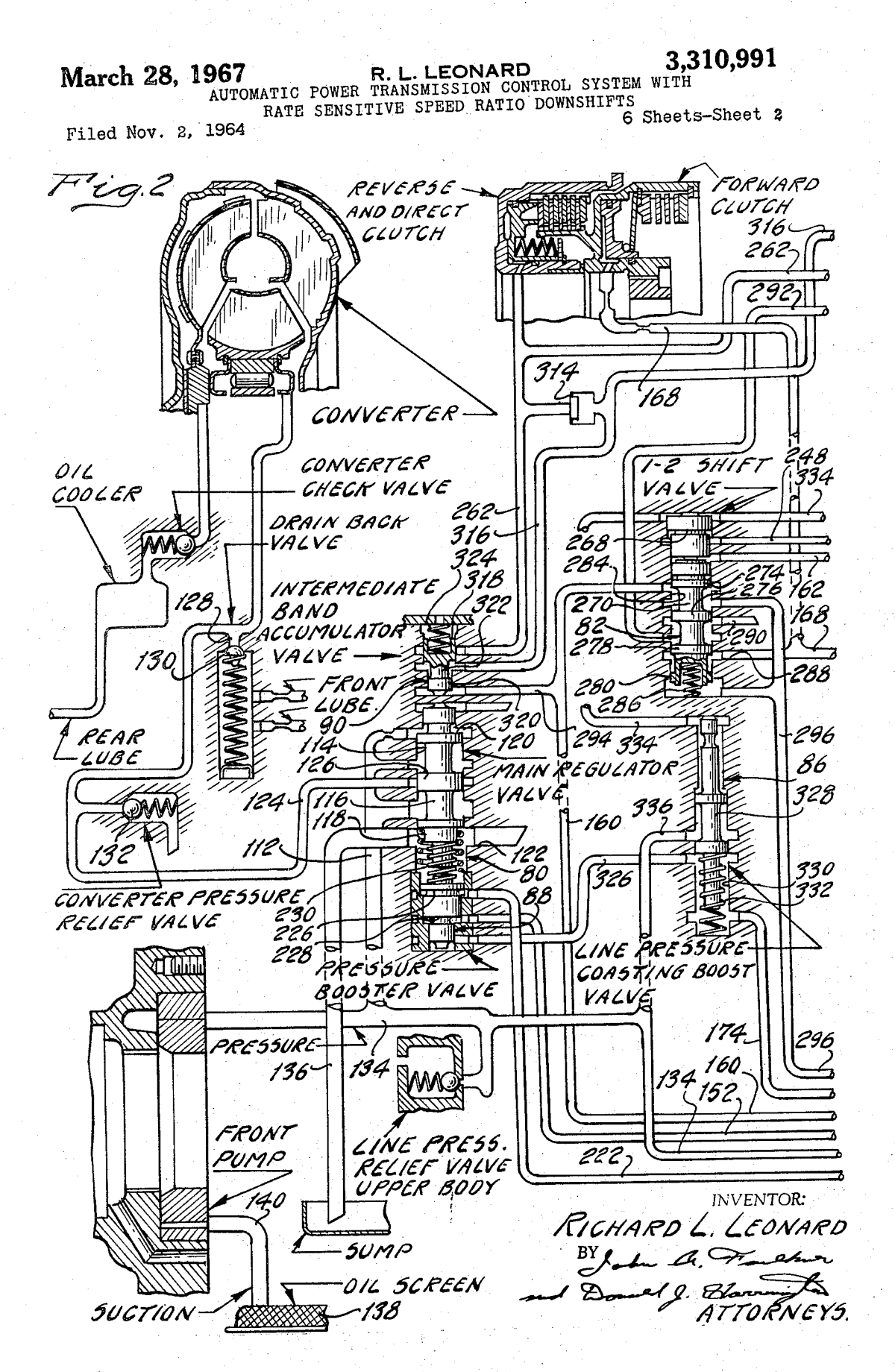

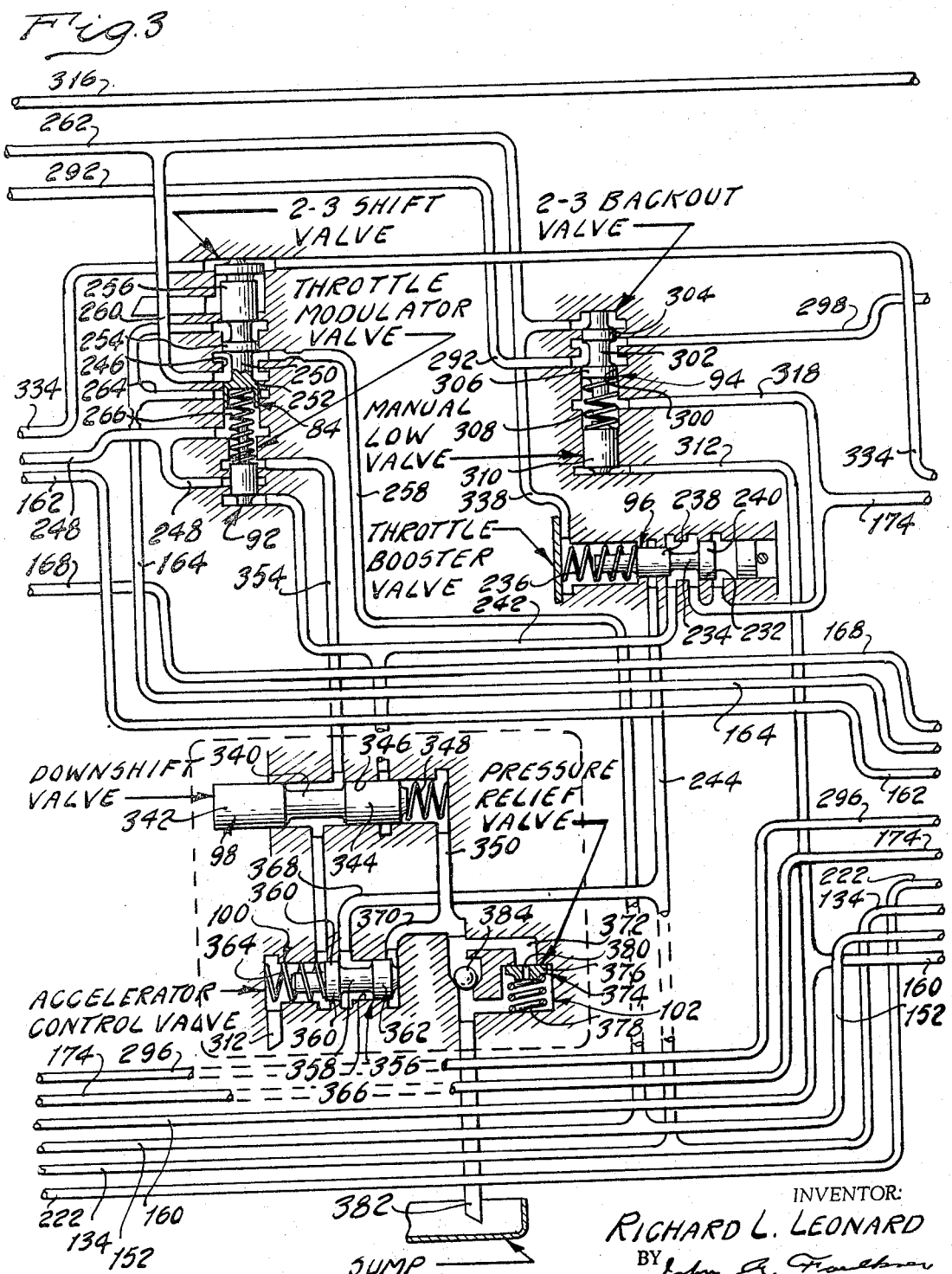

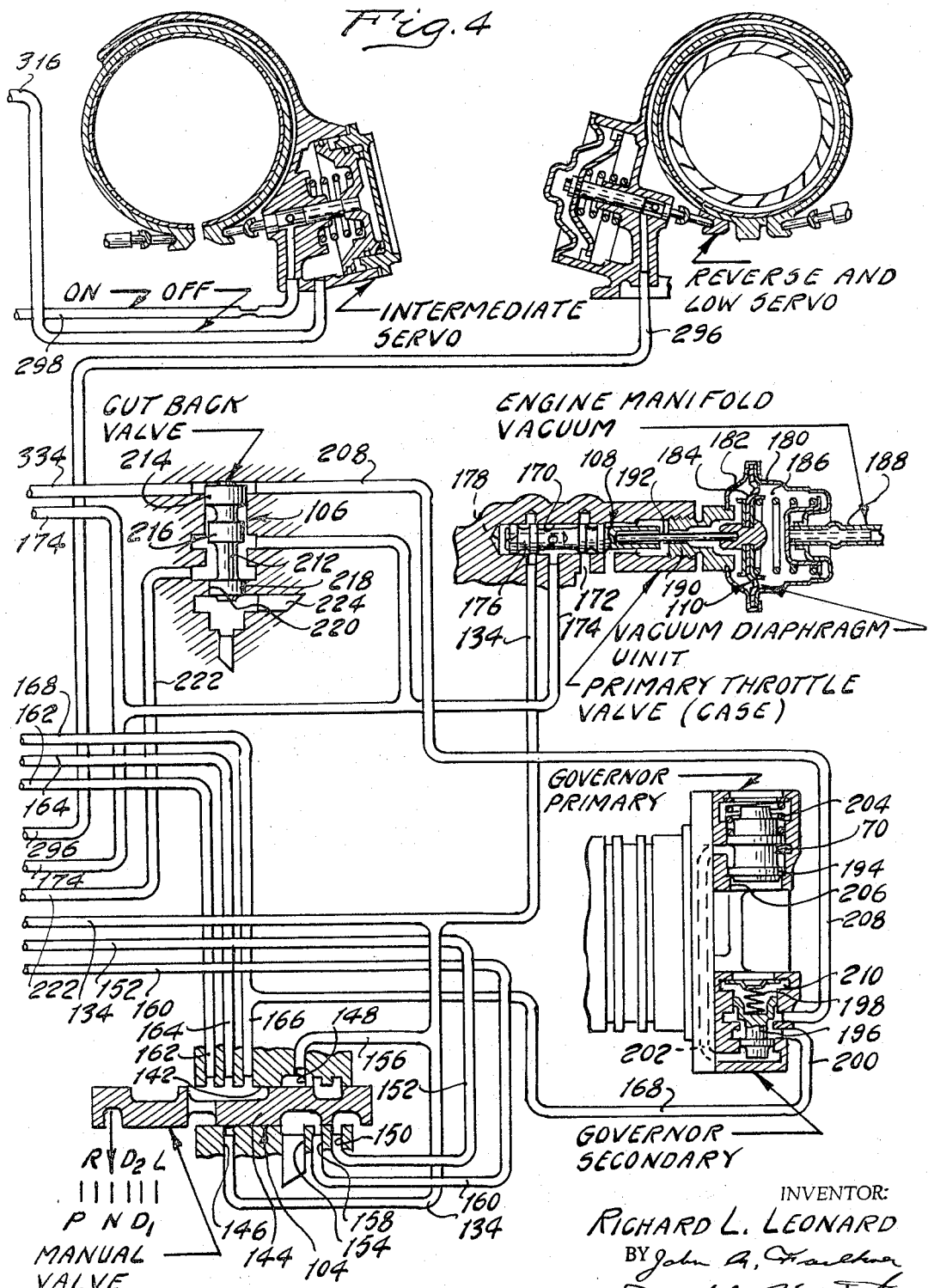

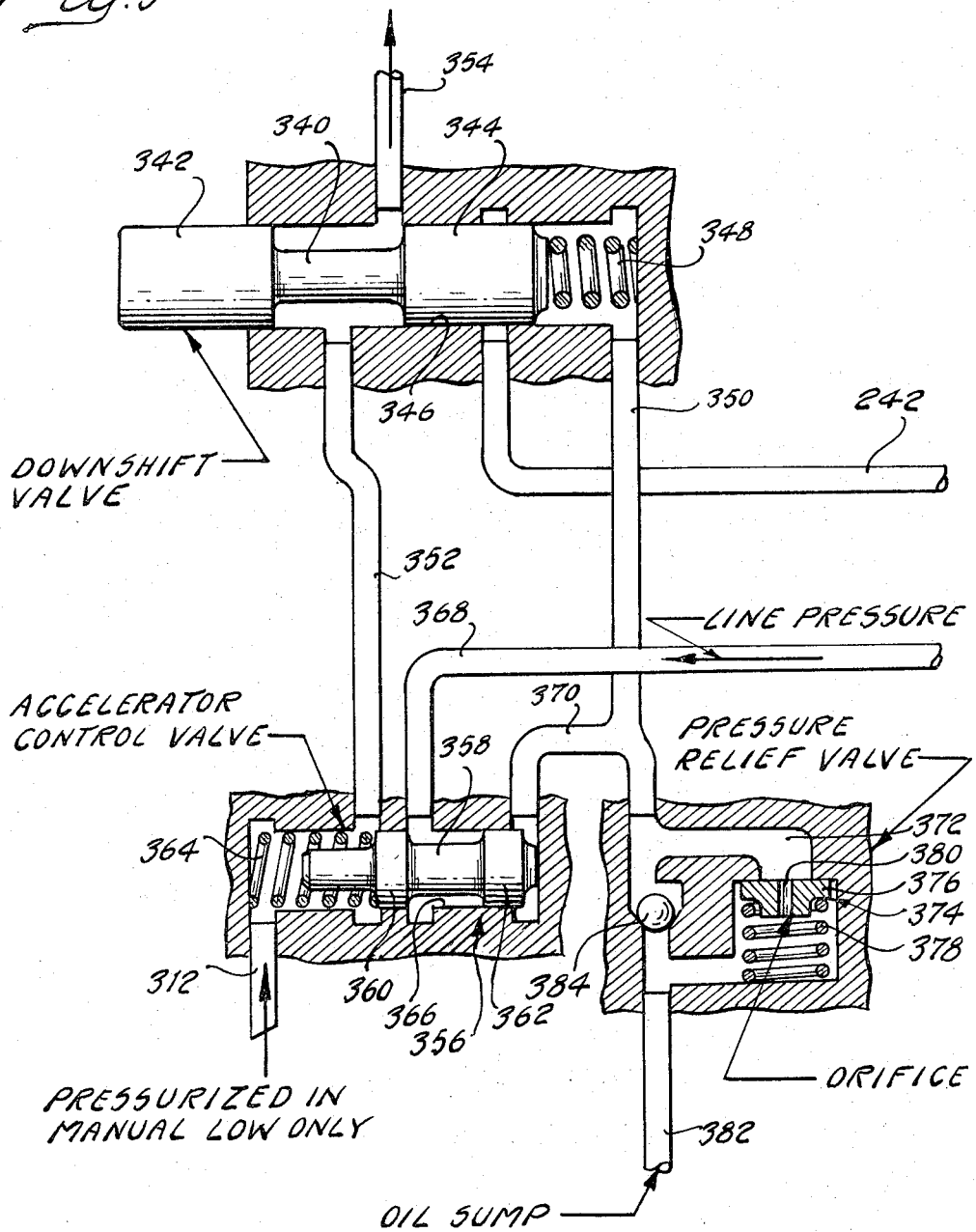

3,310,991
AUTOMATIC POWER TRANSMISSION CONTROL SYSTEM WITH RATE SENSITIVE SPEED RATIO DOWNSHIFTS
Richard L. Leonard, Farmington, Mich., assignor to Ford Motor Company, Dearborn, Mich., a corporation of Delaware
Filed Nov. 2, 1964, Ser. No. 407,975
12 Claims. (Cl. 74—472)

My invention relates generally to automatic control valve systems for multiple speed ratio power transmission mechanisms, and more particularly to an automatic power transmission mechanism for an automotive vehicle driveline wherein provision is made for obtaining a transition from one operating zone to another in response to changing operating demands by the vehicle operator.

The improved control system of my invention is adapted especially to be used with a multiple speed ratio power transmission mechanism having more than two normal driving speed ratios. It may include several components that are found also in conventional control systems for automotive vehicle drivelines. These components include fluid pressure operated servos that may be applied and released selectively to control the relative motion of torque transmitting gear elements of the gear system, the latter forming plural torque delivery paths between the vehicle engine and the vehicle traction wheels. Such conventional systems are provided with a fluid pressure source, usually in the form of a positive displacement pump, that is drivably connected to rotary portions of the driveline. Conduit structure connects the pump with the servos. The conduit structure is defined in part by fluid pressure distributor valves that distribute control pressure to the various servos to initiate speed ratio changes. The fluid pressure distributor valves respond to pressure signals that are sensitive to vehicle speed and to either engine torque or engine torque demand.

In a three-speed ratio power transmission system of this type it is usual practice to provide two shift valves that function as the fluid pressure distributors. When both shift valves assume their low speed ratio positions, the gearing establishes a low speed ratio torque delivery path between the engine and the traction wheels. As the vehicle speed increases for any given magnitude of the torque signal, a first shift valve will respond and will assume a position that will condition the servos for operation in an intermediate speed ratio. Upon a further increase in speed for any given magnitude of the torque signal, the second shift valve will respond thereby conditioning the gearing for operation in the highest speed ratio, which usually is a 1:1 direct drive.

In certain control systems of known construction, the automatic operation of the shift valves can be overruled by a so-called driver controlled downshift valve system that will force the gearing to assume an underdrive ratio. Following operation in the high speed ratio, the driver then can obtain a greater tractive effort for acceleration purposes. The transmission in such cases normally will assume the lowest underdrive ratio. In order to obtain such a downshift, however, it is necessary for the vehicle operator to advance the engine carburetor throttle valve setting to its maximum, wide-open position.

In another valve system of the type which is disclosed in copending application Ser. No. 277,855, filed by Robert P. Zundel and myself, it is possible to obtain a so-called "torque demand" downshift from the high speed ratio to the intermediate speed ratio when the vehicle speed is less than a predetermined value. This is done simply by advancing the engine carburetor throttle setting to an intermediate position. A forced downshift from the high speed ratio to the low speed ratio, of course, can be obtained also in this system by advancing the engine carburetor throttle setting to the maximum position just as in conventional arrangements. At any vehicle speed in excess of that predetermined value, however, a part throttle or torque demand downshift from the high speed ratio to the intermediate speed ratio is not available. At a speed in excess of that predetermined speed but less than a predetermined higher limiting speed, a downshift can be obtained only by operation of the forced downshift valve system.

It has been found that greater flexibility in the performance of a multiple speed ratio power transmission system can be obtained if the intermediate speed ratio is utilized as it is in the control system of copending application Ser. No. 277,855. This makes the intermediate speed ratio available to the driver during cruising, as distinguished from acceleration of the vehicle from a standing start. Unless a torque demand downshift is available, the transmission system will function in much the same fashion during cruising as a two-speed ratio power transmission mechanism. By utilizing the intermediate speed ratio during part throttle downshifts, the full performance potential of a three-speed ratio or four-speed ratio power transmission system can be realized.

It may be difficult with some automatic control systems to establish satisfactorily the 3–2 part throttle downshift points and to control them properly once the system has been calibrated. It has been found that a control system can be made over-sensitive to engine loading when part throttle downshift features are introduced. For example, it is possible under some conditions, such as during cornering or during operation on a grade, for the transmission to shift when a shift is not desired. On the other hand, it is possible also to calibrate the system so that it is too insensitive to changes in road conditions or to changes in the engine torque signal. In the latter instance, little use is made of the intermediate speed ratio except under wide-open throttle operating conditions.

In my improved system I have made provision for obtaining part-throttle downshifts in a multiple speed ratio power transmission system, but a downshift is available to the driver only under those conditions when he desires additional vehicle performance. The provision of a system of this type is a principal object of my invention.

It is a further object of my invention to provide a multiple speed ratio power transmission system of the type above set forth wherein part-throttle downshifts at high vehicle speeds can be obtained without introducing excessive sensitivity of the transmission system to changes in the magnitude of the torque signal at lower vehicle speeds.

It is a further object of my invention to provide for use in a control system of the type above set forth, a downshift valve arrangement that responds to the rate of movement by the vehicle operator of the engine carburetor throttle valve to provide an automatic speed ratio downshift when the carburetor throttle valve is advanced rapidly. I contemplate, however, that the downshift valve arrangement will be insensitive to engine throttle movement by the vehicle operator when the engine throttle is advanced at a lower rate.

It is a further object of my invention to provide an improved valve system of the type above set forth wherein provision is made for obtaining part-throttle downshifts regardless of the vehicle speed.

It is a further object of my invention to provide in a control system of the type above set forth a driver controlled downshift valve for obtaining forced downshifts when the vehicle carburetor throttle setting is advanced to the wide-open position. This forced downshift valve may be made insensitive to the rate of movement of the engine carburetor throttle valve.

For the purpose of describing my invention more particularly, reference will be made to the accompanying drawings, wherein:

FIGURE 1 shows in schematic form a multiple speed ratio gearing arrangement capable of being used with my improved control system;

FIGURES 2, 3 and 4 show in schematic form the valve elements for my control system;

FIGURE 5 is an enlarged view of the rate sensitive downshift valve arrangement that is included in the control system of FIGURES 2, 3 and 4; and FIGURE 6 is a schematic drawing illustrating an alternate rate sensitive downshift valve arrangement which forms a counterpart for the valve arrangement of FIGURE 5.

In FIGURE 1, numeral 10 designates an internal combustion vehicle engine and numeral 12 designates the vehicle traction wheels or road wheels. The engine 10 includes an air-fuel mixture intake manifold that is supplied by a throttle valve controlled carburetor 14. The magnitude of the pressure in the engine intake manifold is used, as will be explained subsequently, as a variable for obtaining an engine torque signal that may be utilized by the control system.

The engine crankshaft is connected to a bladed impeller 16 for a hydrokinetic torque converter mechanism indicated generally at 18. This mechanism includes also a bladed turbine 20 and a bladed stator 22. The impeller, the turbine and the stator are situated in toroidal fluid flow relationship in the usual fashion. The impeller is connected to a front pump, which may be a positive displacement gear pump. This pump, which is driven whenever the engine is in operation, supplies fluid for the automatic control valve system to be explained subsequently with reference to FIGURES 2 through 6.

A stator 22 is connected to a stationary stator sleeve shaft 24 by means of an overrunning brake 26. This overrunning brake inhibits rotation of the stator 22 in a direction opposite to the direction of rotation of the impeller, but it permits freewheeling motion of the stator in the direction of rotation of the impeller.

The turbine 20 is connected directly to turbine shaft 28. This shaft is connected selectively to clutch drum 30 by means of a selectively engageable friction clutch 32. Clutch drum 30 forms a portion 34 of a direct and reverse clutch 36. That clutch defines an outer brake drum about which is disposed an intermediate brake band that is engaged and released by means of a fluid pressure operated intermediate brake servo. This servo includes a cylinder and a double-acting piston which cooperate to define a pair of opposed working chambers as indicated. When both pressure chambers are pressurized, the servo assumes a released condition. On the other hand, when the left-hand pressure chamber is pressurized and the right-hand pressure chamber is exhausted, the intermediate servo becomes applied.

Selectively engageable forward clutch 32 includes also a clutch member 40 that is connected directly to the ring gear 42 of a first planetary gear unit 44. A second planetary gear unit shown at 46 includes a ring gear 48, which may be formed with a pitch diameter that is the same as the pitch diameter of ring gear 42. Gear unit 44 includes a planet pinion carrier 50 and a corresponding planet pinion carrier 52 is provided for gear unit 46. Planetary pinions 54 are rotatably journaled upon carrier 50, and planetary pinions 51 are rotatably journaled upon carrier 52. Both sets of pinions 54 and 51 mesh with their respective ring gears and also with a common sun gear 58. The sun gear is connected by means of a drive shell 60 with the brake drum associated with the direct and reverse clutch 36.

Both carriers 50 and 52 are connected to power output shaft 62, the latter in turn being connected to the road wheels 12. Carrier 52 defines a brake drum about which is positioned a manual low and reverse brake band 64.

This brake band can be applied and released by a reverse and low servo that comprises a cylinder and a servo piston. The piston and cylinder cooperate to define a single fluid pressure working chamber which can be pressurized and exhausted selectively. When it is pressurized, brake band 64 anchors the carrier 52.

Carrier 52 may be anchored also by means of an overrunning brake that includes a cammed race 66 and overrunning brake elements, which may be in the form of rollers 68. Race 66 can be connected to the relatively stationary transmission housing. The overrunning brake shown in part at 68 inhibits rotation of the carrier in one direction thereby providing a forward drive reaction point. Brake 64, however, is capable of inhibiting rotation of the carrier in either direction.

A compound governor valve assembly having a primary governor and a secondary governor is connected to power output shaft 62 for the purpose of establishing a vehicle speed signal that can be utilized by the control system.

A brake drum associated with a direct and reverse clutch 36 is adapted to define an annular cylinder 78 within which is positioned an annular piston 76. Pressure can be distributed to the pressure working chamber defined by this piston and cylinder through a suitable feed passage. The clutch drum 30 also defines an annular cylinder as shown at 72. An annular piston 74 is situated within cylinder 72 and cooperates therewith to define a fluid pressure working chamber than can be supplied with fluid pressure through a suitable feed passage.

Referring next to FIGURES 2, 3 and 4, the principal valve components are identified by suitable reference legends. They include a main regulator valve 80, a 1-2 shift valve 82, a 2-3 shift valve 84, a line pressure coasting boost valve 86, a pressure booster valve 88 for the main regulator valve, an intermediate band accumulator valve 90, a throttle modulator valve 92, a 2-3 back-out valve 94, a throttle booster valve 96, a downshift valve 98, an accelerator control valve 100, a pressure relief valve 102, a driver-controlled manual valve 104, a cutback valve 106, a primary throttle valve 108, an engine manifold pressure operated servo having a vacuum diaphragm 110, and a compound governor valve assembly which was identified previously by reference character 70. The system includes also fluid pressure operated servos for the two brakes and the two clutches.

Reference may be made to the copending application of Richard L. Leonard and Robert P. Zundel, Ser. No. 277,855, for the purpose of supplementing this disclosure. Since the various valve components have been described in particular in that application, the description of the counterpart valve elements disclosed in this application will be relatively general in character, but it will be sufficient to indicate the function of each of the components.

The front pump described with reference to FIGURE 1 communicates with the main regulator valve 80 through a passage 112. The regulator valve includes a valve chamber 114 within which is slidably positioned a multiple land valve spool 116. A valve spring 118 urges the spool 116 in an upward direction as viewed in FIGURE 2. Fluid pressure made available by the pump acts upon a differential annular area 120 formed on the spool 116.

The upper end of the valve chamber 114 is exhausted. Another exhaust point is provided by an exhaust port 122 formed in the chamber 114.

The regulator valve provides a control pressure in a converter feed passage 124 which extends from the torus region of the hydrokinetic torque converter to the chamber 114 at a point adjacent regulator valve land 126. Passage 124 communicates with lubrication points in the front sub-assembly of the transmission system of FIGURE 1 through a lubrication oil passage 128. A spring loaded drain-back check valve 130 provides one-way flow through the passage 128. Valve 130 prevents reverse flow of fluid from the hydrokinetic torque converter to other parts of the control system through the main regulator valve. A maximum converter pressure is established by a pressure relief valve 132.

Line pressure supply passage 134 communicates with the front pump output passage 112. The exhaust port 122 communicates with the sump region of the transmission system through a low pressure oil return passage 136. An oil filter screen 138 can be located in the sump, the latter being defined by the lower housing portion of the transmission mechanism. The intake side of the front pump communicates with the sump through a supply passage 140.

The various operating speed ratio ranges that may be made available by the automatic control system are selected by the operator by appropriately positioning the manual valve 104. This valve includes a valve chamber 142 within which is positioned a multiple land valve element 144. Control pressure passage 134 communicates with the pressure supply ports 146 and 148. The various operating positions for the valve element 144 are indicated in FIGURE 4 by reference characters R, N, D2, D1 and L. These identify respectively the positions of the valve element 104 that will condition the transmission mechanism for operation in Reverse, Neutral, Second Drive Range, First Drive Range, and Low Drive Range.

A port 150 formed in the manual valve communicates with a passage 152 which extends to the 2-3 shift valve 84 and to the pressure booster valve 88. It is exhausted through the right-hand end of manual valve chamber 142 when the manual valve assumes the Neutral position shown in FIGURE 4. When the manual valve assumes the D2 position, however, port 150 is exhausted through an exhaust port 154 formed in the manual valve. Passage 152 is exhausted through the exhaust port on the right-hand end of valve chamber 142 when the manual valve 144 assumes the D1 position or the L position.

If the manual valve element 144 is shifted to the position R, passage 152 is brought into communication with passage 134 through a branch passage 156 and through a cooperating annular groove associated with port 158. A passage 160, which communicates with the port 158, is brought into fluid communication with passage 152.

Passage 160 extends to the manual Low valve associated with the 2-3 backout valve 94, to the 1-2 shift valve 82 and to the intermediate band accumulator valve 90. This same passage 160 is pressurized also when the manual valve element 144 is shifted to the L position since in this case the port 158 will be brought into communication with passage 156 across the manual valve chamber 142.

Three other control pressure passages communicate with the manual valve chamber 142. These are identified by reference characters 162, 164 and 166. All three of these passages are exhausted through the exhaust opening at the left-hand end of the valve chamber 142 when valve element 144 assumes the Neutral position shown. The same is true when the element 144 assumes the Reverse drive position. If the manual valve is moved to the D2 position, however, the three passages 162, 164 and 166 communicate across the valve chamber 142 with the passage 134.

If the manual valve element 144 assumes the D1 position, passages 164 and 166 continue to be pressurized although passage 162 becomes exhausted through the left-hand end of the valve chamber 142.

If the manual valve element 144 is shifted to the L position, only passage 166 continues to be pressurized as both passages 162 and 164 become exhausted through the left-hand end of the manual valve chamber 142.

Passage 166 communicates with a passage 168 which extends directly to the forward drive clutch servo and to the 1-2 shift valve. It extends also to the secondary governor valve element of the governor valve assembly 70, which will be described subsequently. Passage 164 communicates directly with the 2-3 shift valve assembly 84 and passage 162 communicates with the upper portion of the 1-2 shift valve assembly 82.

Each of the shift valves responds to an engine vacuum sensitive pressure signal and a vehicle speed sensitive pressure signal. The vacuum signal is obtained by means of the primary throttle valve 108 and vacuum diaphragm 110. The throttle valve includes a valve chamber 170 within which is positioned slidably a throttle valve spool. Control pressure from passage 134 is distributed to the throttle valve chamber 170 and an exhaust port 172 communicates with the chamber 170 at a location spaced from the passage 134. An output pressure passage 174 is in communication with the chamber 170 at a location intermediate port 170 and passage 134. The pressure in this passage 174 is distributed to the left-hand side of the throttle valve element, which is identified by reference character 176, a suitable internal passage 178 being provided for this purpose. The periphery of flexible diaphragm 184 cooperates with the housing parts 180 and 182 to define a manifold pressure chamber 186. This chamber is in communication with the fuel-air mixture intake manifold for the internal combustion engine in the driveline. A fluid fitting 188 is provided for establishing a suitable connection between the cavity 186 and a conduit that extends to the engine manifold.

Housing part 182 can be connected by means of a threaded adaptor 190 to an internally threaded opening in the valve body for the primary throttle valve 108. The forces acting upon the diaphragm 184 can be distributed to the throttle valve element 176 through an actuator rod 192.

The pressure supplied to the chamber 170 by the passage 134 is modulated to produce a resultant pressure signal in passage 174 that is proportional in magnitude to the engine intake manifold pressure. This provides a general indicator of the engine torque.

The vehicle speed signal is obtained by means of the governor valve assembly 70. It includes a pair of governor valve chambers situated in a common valve body on opposed sides of the power output shaft. These valve chambers receive respectively the primary governor valve element 194 and the secondary governor valve element 196. Element 196 is urged in a radially outward direction by a valve spring 198. Passage 168, when it is pressurized, supplies control pressure to the valve chamber for valve element 196. This same control pressure is distributed to governor passages 200 and 202, the latter connecting the radially outward end of the secondary governor valve chamber to the primary governor valve chamber. Communication between the passage 200 and passage 202 is controlled by the primary governor valve element 194. It is biased normally in a radially inward direction by valve spring 204 when the speed of rotation of the transmission power output shaft reaches a predetermined value. Valve element 194 will shift in a radially outward direction thereby causing the passage 202 to communicate with the exhaust region through an exhaust port 206. When the valve element 194 assumes the position shown, however, free communication is established between passage 200 and passage 202.

When the transmission power output shaft is stationary, control pressure is distributed directly from supply passage 168 to passage 202 and to the radially outward end of the valve element 196. This valve element then is urged in a radially inward direction to seal the passage 200. This causes a governor pressure output passage 208 to communicate with an exhaust port 210. Governor pressure output passage 208 then is subjected to a pressure of zero. When the speed of rotation of the transmission power output shaft increases to a predetermined value (for example 400 r.p.m.) the valve element 194 will shift in a radially outward direction thereby exhausting passage 202. This then allows the secondary valve element 196 to modulate the pressure in passages 168 and 200 to produce a resultant pressure signal in passage 208 that is an indicator of the driven speed of the power output shaft.

The governor pressure passage 208 communicates with the upper end of the 1–2 shift valve assembly 82 and with the upper end of the 2–3 shift valve assembly 84. It communicates also with the upper end of the valve element 212 for the cut-back valve assembly 106. Element 212 is formed with the several valve lands identified by reference characters 214, 216 and 218. These cooperate with internal valve lands formed in valve chamber 220 for the cut-back valve 106. The valve lands 214 and 216 define a differential area that is in fluid communication with throttle pressure passage 174. This results in a force that normally urges the valve element 212 in an upward direction against the opposing influence of governor pressure. At some predetermined vehicle speed for any given throttle pressure in passage 174, valve element 212 will shift in a downward direction. This then establishes communication between a cut-back pressure passage 222 and an exhaust port 224. When the valve element 212 assumes the position shown, however, communication is established between passage 222 and throttle pressure passage 174.

When passage 222 is pressurized, pressure is distributed to a differential area 226 formed on the pressure booster valve 88. This produces a pressure force on a spool valve element 228 for the pressure booster valve 88. A spring 230 is situated between element 228 and the main regulator valve element 116. Element 228 forms an anchor for the spring 230. When the pressure force acting in an upward direction upon element 228 exceeds the loading of the spring 230, the pressure force acting on differential area 226 will supplement the biasing action of spring 118. This then causes an increase in the line pressure made available to passage 134. The boost does not occur until the pressure force acting on land 226 increases to a value that exceeds the loading of spring 230.

The throttle booster valve 96 functions to increase the magnitude of the effective signal made available to the shift valves by the throttle valve and the diaphragm assembly. It does this, however, only after the magnitude of the pressure signal in passage 174 exceeds a predetermined value. In this way the upshifts during the acceleration period can be delayed to provide a more satisfactory shift point under advanced throttle operating conditions. This booster valve assembly is required to provide the needed shift delay under these conditions since the magnitude of the engine manifold pressure does not increase appreciably upon an increase in the setting of the engine carburetor throttle valve after the throttle valve setting is advanced to a range greater than the medium throttle position.

Valve assembly 96 includes a valve chamber 232 within which is positioned a valve element 234. This valve element is urged in a right-hand direction, as viewed in FIGURE 3, by a valve spring 236. Valve element 234 includes a pair of spaced valve lands 238 and 240, the diameter of the latter being greater than the diameter of the former. The right-hand side of land 240 communicates with throttle pressure passage 174. Passage 174 communicates also with the valve chamber 232 at a location intermediate lands 238 and 240. In a similar fashion, booster valve assembly output pressure passage 242 communicates with the valve chamber 232 at a location intermediate lands 238 and 240. Control pressure is distributed to the chamber 232 through a branch passage 244 which communicates with the main control pressure passage 134.

At any throttle setting less than the calibrated mean value, the pressure signal made available to passage 242 is equal in magnitude to the output pressure of the carburetor throttle valve. If the magnitude of the pressure in passage 174 increases to a value that corresponds to a throttle setting greater than the mean calibrated value, valve element 234 will be shifted in a left-hand direction against the opposing influence of spring 236. The valve element 234 then will begin to modulate the pressure in passage 244 to produce a resultant signal in passage 242 that is higher than the magnitude of the throttle pressure in passage 174.

Passage 242 distributes the output pressure of the throttle booster valve to the lower end of the throttle modulator valve 92, which is situated in a reduced diameter portion of the valve chamber 246 for the 2–3 shift valve assembly. This valve reduces the effective pressure made available to the throttle modulator output pressure passage 248. The function of the throttle modulator valve is to establish minimum throttle upshift points.

The 2–3 shift valve assembly includes a valve element 250 which is formed with multiple lands 252, 254 and 256. These lands cooperate with internal lands formed in the valve chamber 246.

The portion of the chamber 246 intermediate lands 252 and 254 communicates with passage 152 through a passage 258. Passage 258 communicates with the exhaust region through port 150 during operation of the transmission in the D2 range or the D1 range. Thus, when the spool 250 assumes the position shown, passage 260 communicates with the exhaust region through passage 258. Passage 260 in turn communicates with the passage 262 which acts as a reverse and direct clutch servo feed passage. On the other hand, when valve element 250 is urged downwardly under the influence of governor pressure for any given engine manifold pressure, passage 260 is brought into communication with passage 264. This passage in turn communicates with passage 164, described previously.

The modulated throttle pressure in passage 248 acts upon the lower end of the land 252 and supplements the action of spring 266. The same pressure in passage 248 acts upon the differential area shown at 268 on the 1–2 shift valve assembly 82. This assembly includes a valve element 270 having multiple valve lands 274, 276, 278 and 280. Element 270 is positioned within a valve chamber 284 having internal valve lands which cooperate with its valve lands. A valve spring 286 biases the element 270 in an upward direction, as viewed in FIGURE 2, against the opposing influence of governor pressure. An exhaust port 288 communicates with the chamber 284 adjacent land 278. Another exhaust port 290 communicates with chamber 284 in a location adjacent land 276.

Passage 292 communicates with the chamber 284 intermediate lands 278 and 276. This passage extends to the 2–3 backout valve 94, which will be explained subsequently.

Passage 160, which is pressurized when the manual valve assumes the Low or Reverse drive positions, communicates with passage 294 which extends to the valve chamber 284 at a location adjacent land 274. It also extends to the accumulator valve 90, which will be explained subsequently.

When the valve element 270 assumes the position shown, communication is established between passage 294 and passage 296 which extends to the reverse and low servo. Passage 292 is exhausted through exhaust port 290. If the valve element 270 assumes the downward position, passage 292 is brought into fluid communication with passage 168, which is always pressurized during operation on the mechanism in the forward drive ranges. This passage, as explained previously, communicates directly with the forward drive clutch.

Passage 292 communicates with the passage 298 through the 2–3 back-out valve chamber 300. Passage 298 in turn extends to the apply side of the intermediate servo.

The 2–3 back-out valve assembly 94 includes a valve spool 302 having spaced valve lands 304 and 306. The spool 302 is biased normally in an upward direction, as viewed in FIGUURE 3, by means of spring 308. When it assumes this position, free communication is established between passage 292 and passage 298. The upper end of land 304 is in fluid communication with passage 262 which is pressurized whenever the reverse and direct drive clutch is applied.

A manual low valve element 310 is disposed at the lower end of valve chamber 300, and the spring 308 is situated between valve 310 and the lower end of land 306. The lower end of valve 310 in turn is in communication with passage 312, which extends to passage 160. Thus when the manual valve is shifted to the L or R positions, the 2–3 back-out valve element 302 is forced to assume the upward position shown in FIGURE 3.

Upon movement of the 2–3 shift valve assembly in a downward direction under the influence of governor pressure, passage 262 becomes pressurized. This same pressure is distributed across a one-way check valve 314 to a passage 316 which extends to the release side of the intermediate servo. Thus the direct drive clutch and the release side of the intermediate servo tend to become pressurized simultaneously.

Throttle pressure is distributed to the 2–3 back-out valve chamber 300 through a branch throttle pressure passage 318. The output pressure of the primary throttle valve 108 thus supplements the action of the spring 308 as the pressure in passage 262 is built-up following a speed ratio shift from the intermediate speed ratio to the direct drive, high speed ratio. The direct drive clutch becomes fully applied and the intermediate servo becomes released at a time prior to the instant that the pressure in passage 262 is sufficient to overcome the upwardly directed forces acting upon the valve element 302. If an upshift is initiated, however, when the throttle pressure in passage 318 is at a minimum, the pressure build-up in the direct drive clutch will be sufficient to cause valve element 302 to shift in a downward direction prior to the time that the pressure in the release side of the intermediate servo is sufficient to cause the brake to become released. Under these conditions, passage 262 and the direct drive clutch becomes hydraulically connected to passage 298 and the apply side of the intermediate servo. This cushions the application of the direct drive clutch. Under such minimum torque conditions, the end point for the clutch is not reached until after the intermediate servo becomes released. An overlap is not desirable under these conditions.

The accumulator valve 90 provides controlled communication between passage 316 and passage 262. It functions to cushion the engagement of the intermediate brake by the brake servo during a 1–2 upshift. As the intermediate servo piston is stroked to the brake applied position, the release side of the intermediate servo pressure chamber functions as an accumulator as the fluid displaced from it passes through passage 316. This causes a pressure to be developed on the differential area defined by valve lands 318 and 320 of the accumulator valve element 322. The force produced by this pressure is opposed by valve spring 324. Thus a pressure build-up of approximately 10 p.s.i. is obtained whenever the intermediate servo is applied. Passage 262 under these conditions communicates with the exhaust region through the 2–3 shift valve and through passages 258 and 152. The flow restricting action of the accumulator valve can be overruled, however, by introducing control pressure to passage 294. This occurs whenever the manual valve is shifted to the R or L positions.

To meet the variation in the torque transmitting requirements that occurs when the engine manifold pressure changes, throttle pressure passage 174 is caused to communicate with a passage 326. The throttle pressure then is caused to act on the lower end of pressure booster valve element 228. If the magnitude of this pressure is sufficient to overcome the force of spring 230, the line pressure will be increased upon an increase in the magnitude of the pressure in passage 174.

Communication between passage 174 and passage 326 is established by the line pressure coasting boost valve. This consists of a valve spool 328 that is situated within a valve chamber 330. It is biased in an upward direction by valve spring 332. When it assumes the position shown in FIGURE 2, direct communication is established between passages 174 and 326. The upper end of the valve element 328 is subjected to governor pressure, the latter being distributed to the valve 86 through passage 334. Control pressure is distributed to the valve chamber 330 through a passage 336 which communicates with main control pressure passage 134. When the vehicle speed is greater than a predetermined value and when the magnitude of the throttle pressure in passage 174 is at a value that corresponds to a minimum engine throttle position, the valve element 328 will be shifted in a downward direction thereby establishing communication between passages 326 and 336. This causes control pressure to be distributed to the lower end of the pressure booster valve 88. This greatly augments the regulated value of the control pressure. Sufficient torque transmitting capacity then is obtained in the servos to accommodate the engine braking torque that occurs.

Once the direct drive condition is achieved following acceleration from a standing start, a torque demand downshift from the high speed ratio to the intermediate speed ratio cannot be obtained since the throttle booster valve then becomes pressurized with the same pressure that is made available to the direct drive clutch. Passage 338 is provided for this purpose. This passage establishes communication between passage 262 and the left-hand side of the booster valve element 234. Thus the maximum throttle pressure signal made available to the shift valves will not be sufficient to establish a downshift condition. The booster valve and the shift valves can be overruled, however, by means of a downshift valve which now will be described.

The downshift valve comprises a valve spool 340 having a pair of spaced valve lands 342 and 344 which slidably cooperate with internal valve lands formed in valve chamber 346. A downshift valve spring 348 normally urges the spool 340 in a left-hand direction as viewed in FIGURE 5. A suitable linkage mechanism may be provided for permitting the vehicle operator to move the valve spool 340 in a right-hand direction against the opposing force of spring 348. By preference, the linkage mechanism may form a part of the engine carburetor throttle linkage so that when the engine carburetor throttle is moved to the wide-open position, valve spool 340 is moved from the position shown in FIGURE 5 to a right-hand position.

Throttle pressure passage 174 communicates with the chamber 346 at a location directly adjacent land 344. The right-hand end of chamber 346 communicates with an exhaust passage 350. Another exhaust passage 352 communicates with the chamber 346 at a location intermediate lands 342 and 344. It will be apparent, therefore, that when the downshift valve spool 340 is shifted in a right-hand direction upon movement of the engine carburetor throttle valve to the wide-open position, communication will be established between throttle pressure passage 354 which extends to the lower end of the 2–3 shift valve land 252. It extends also to the differential area 268 on the 1–2 shift valve element 270. If the vehicle speed is less than a predetermined value, both of the shift valves will assume a downshift position under the influence of this added pressure force. The transmission mechanism then will be conditioned for low speed operation following direct drive operation. If the speed is greater than a predetermined value, however, the pressure made available to passage 354 will be insufficient to cause a downshift of the 1–2 shift valve although the 2–3 downshift valve may be downshifted. This is a safety feature that avails an excessive gear ratio while the vehicle speed is relatively high.

At any engine throttle setting less than the wide-open throttle position, passage 354 is in fluid communication with exhaust passage 352.

An accelerator control valve identified generally by reference character 356 includes a valve element 358 having spaced valve lands 360 and 362. Valve element 358 is biased in a right-hand direction by a valve spring 364. Passage 312, which is pressurized during operation in Low and Reverse only, but which is exhausted under all other conditions, communicates with the left-hand side of the valve chamber for element 358. This chamber is identified by reference character 366.

Control pressure passage 134 communicates with passage 368 which extends to the valve chamber 366 at a location intermediate valve lands 360 and 362. Passage 350, which extends from the downshift valve, communicates with a branch passage 370 which in turn communicates with the right-hand side of the valve land 362. Passage 350 communicates also with a branch passage 372, which extends to an orificed valve 374. This valve comprises a valve plate 376 which normally is seated against a valve seat by a valve spring 378. It is provided with an orifice 380 which establishes restricted, yet continuous, fluid communication between branch passage 372 and exhaust passage 382 which extends to the transmission sump.

A ball check valve 384 provides a one-way fluid communication between passage 350 and passage 382.

If the vehicle operator advances the engine carburetor throttle at a relatively reduced rate, the fluid displaced from the right-hand end of valve chamber 346 passes through the orifice 380. This, of course, produces a pressured differential by reason of the back pressure that is developed. This back pressure, however, is insufficient to cause the valve spool 358 to shift against the influence of spring 364. Thus the passage 354 continues to be exhausted through passage 352 and passage 312. On the other hand, if the vehicle operator advances the engine carburetor throttle at a relatively rapid rate, the pressure build-up at the orifice 380 will be sufficient to cause the valve element 358 to shift thereby allowing line pressure in passage 368 to pass to passage 352. At the same time, communication between passage 352 and the exhausted passage 312 is interrupted. The line pressure then passes from passage 352 and through the downshift valve chamber 346 to the downshift pressure passage 354. This initiates a torque demand downshift.

As the engine carburetor throttle is relaxed, the valve element 340 is allowed to shift under the influence of spring 348 in a left-hand direction. One-way check valve 384 then becomes unseated to allow oil to be drawn from passage 382 and through passage 350 to the right-hand end of the valve chamber 346.

If the vehicle operator advances the engine carburetor throttle at an excessive rate of speed, valve plate 376 becomes unseated. This avoids an excessive pressure build-up in the system and limits the resistance experienced by the vehicle operator to the movement of the engine carburetor throttle toward the wide-open position.

Part-throttle downshifts thus can be obtained with reliability by the vehicle operator whenever he demands more engine torque for acceleration purposes. Downshifts are avoided when additional torque is not required or desired. Variations in the throttle pressure that are caused by cornering of the vehicle or by normal variations in the grade of the road over which the vehicle travels then will not cause an unwanted downshift. The shift points may be calibrated precisely, and the calibration will not vary once the shift points have been established. The full performance advantages of a three or four speed ratio power transmission system thus can be realized. Of course, if the vehicle operator requires a normal downshift under wide-open throttle conditions, this still is available, as it is in conventional circuits, by reason of the action of the downshift valve. Any operating conditions requiring a throttle setting of less than the wide-open throttle setting, however, can be obtained only when the vehicle operator advances the engine carburetor throttle at a rate exceeding the rate at which the accelerator control valve will be shifted. Under these conditions the downshift valve acts as a piston pump rather than as a valve.

In FIGURE 6 I have illustrated an alternate downshift system that utilizes control pressure for obtaining the wide-open throttle downshift rather than throttle valve pressure. Thus the downshift valve, as well as the accelerator control valve, can be supplied with pressurized fluid through a common line pressure passage which has been identified by reference character 368'. Passage 384 extends from the control pressure passage 368' to the downshift valve chamber. In other respects, the system of FIGURE 6 is identical to the system of FIGURE 5. For this reason, similar reference characters have been used to designate the various components although prime notations have been added in order to distinguish from the system of FIGURE 5. It will not be necessary, therefore, to repeat a description of the operation with reference to FIGURE 6.

Having thus described preferred embodiments of my invention, what I claim and desire to secure by U.S. Letters Patent is:

1. In an operator controlled valve system for controlling a power transmission mechanism capable of delivering driving torque from a driving member to a driven member, gear elements cooperating to define plural torque delivery paths between said driving member and said driven member, fluid pressure operated servo means for controlling the relative motion of said gear elements to establish each of several driving speed ratios, a fluid pressure source, conduit structures interconnecting said pressure source and said servo means, fluid pressure distributor valve means disposed in and partly defining said conduit structure for selectively distributing control pressure from said source to each of said servo means, a source of a pressure signal that is related in magnitude to an operating variable, passage means for distributing said signal to said distributor valve means to actuate the same, and downshift valve means for overruling the automatic action of said distributor valve means in response to the rate at which accelerating torque is demanded by the operator, said downshift valve means comprising a personally operable fluid piston, a fluid cylinder receiving said piston and defining therewith a pressure cavity, an accelerator control valve, a control pressure conduit communicating with and partly defined by said accelerator control valve and extending to said pressure source, a fluid connection between said cavity and said accelerator control valve to distribute to the latter an actuating pressure and to shift the same from a pressure conduit blocking position to a pressure conduit opening position as the pressure in said cavity is increased upon movement of said piston.

2. In a driver controlled automatic power transmission system for an automotive vehicle having an internal combustion engine with an engine throttle and an engine throttle controlled air-fuel mixture intake manifold, a driven member, gear elements cooperating to define plural torque delivery paths from said engine to said driven member, clutch and brake means for controlling the relative motion of said gear elements to establish each of several speed ratios, separate fluid pressure operated servo means for actuating said clutch and brake means, a fluid pressure source, conduit structure interconnecting said source and said servo means, distributor valve means disposed in and partly defining said conduit structure for controlling distribution of pressure to said servo means to actuate the same selectively, a source of at least one fluid pressure signal that is proportional in magnitude to an operating variable, a passage means for distributing said signal to said distributor valve means for actuating the latter, driver controlled downshift valve means including a movable element connected mechanically to said engine throttle for overruling the action of said distributor valve means to initiate a downshift from one one speed ratio to a relatively lower speed ratio, said downshift valve means including branch and a movable valve piston for establishing fluid communication between said distributor valve means and a high pressure portion of said conduit structure, a fluid connection between said movable valve element and said valve piston for distributing actuating pressure to the former upon displacement of the latter in respone to a high rate of movement of said engine throttle.

3. In a power transmission system adapted to deliver power from a throttle controlled internal combustion engine to a driven member, gear elements cooperating to define plural torque delivery paths between said engine and said driven member, clutch and brake means for controlling the relative motion of said gear elements, fluid pressure operated servo means for actuating said clutch and brake means, a fluid pressure source, conduit structure interconnecting said pressure source and said servo means, distributor valve means disposed in and partly defining said conduit structure for controlling distribution of pressure to said servo means, at least one pressure signal source in fluid communication with said distributor valve means for actuating the latter in response to variations in an operating variable, a downshift valve means including a movable valve element for controlling distribution of a downshift pressure signal to said distributor valve means when the engine throttle is advanced to a wide-open setting, a mechanical connection between said valve element and the engine throttle, an accelerator control valve means for distributing a pressure signal to said distributor valve means for actuating the same in response to a high rate of movement of said valve element toward a wide-open engine throttle position, said accelerator control valve defining in part a fluid passage extending from a high pressure portion of said conduit to said distributor valve means, a fluid connection between said accelerator control valve and said downshift valve means, said movable valve element being adapted to displace fluid from said downshift valve means upon movement thereof toward a wide-open engine throttle position, and a precalibrated flow restricting orifice in fluid communication with said fluid connection, the fluid displaced by said valve element passing through said orifice and thereby creating a back pressure, said accelerator control valve being subjected to said back pressure and actuated thereby when the magnitude of said back pressure exceeds a predetermined value, said accelerator control valve in its actuated position thereby being adapted to distribute a downshift signal to said distributor valve means.

4. A control system for an automatic power transmission system for an automotive vehicle drive line having a throttle controlled internal combustion engine and an air-fuel mixture intake manifold, a driven member, gear elements adapted to establish plural torque delivery paths between said engine and said driven member, clutch and brake means for controlling the relative motion of said gear elements, fluid pressure operated servos for actuating said clutch and brake means, a fluid pressure source, conduit structure interconnecting said pressure source and said servos, fluid pressure distributor valve means situated in and partly defining said conduit structure for controlling the distribution of pressure to said servos thereby initiating selectively speed ratio changes, a source of a pressure signal that is related in magnitude to the driven speed of said driven member, a source of a second fluid pressure signal source that is related in magnitude to engine intake manifold pressure, said distributor valve means being in fluid communication with each pressure signal source, a downshift valve means for overruling the automatic speed ratio tendencies of said distributor valve means including a movable valve element connected mechanically to the engine throttle, a branch passage extending from said second pressure signal source to said distributor valve means, said branch passage being defined in part by said downshift valve means, the latter establishing fluid communication between a portion of said downshift valve means and said second pressure signal source when the engine carburetor throttle is advanced to a wide-open setting, an accelerator control valve, a torque demand downshift pressure passage extending from a high pressure region of said conduit structure to said distributor valve means, said torque demand downshift passage being defined in part by said accelerator control valve, said accelerator control valve being adapted to interrupt communication between said downshift pressure passage and said distributor valve means when it assumes one position and to establish such communication when it assumes another position, means for normally biasing said accelerator control valve to said one position, a fluid connection between said accelerator control valve and said downshift valve means, the valve element of said downshift valve means being adapted to displace fluid through said connection as it is advanced toward a position corresponding to the wide-open engine throttle setting, and a flow restricting orifice situated in and partly defining said connection, said accelerator control valve responding to a back pressure developed by said orifice and movable under the influence of the pressure force produced thereby to said other position when the engine carburetor throttle is moved at a relatively high rate toward the advanced throttle position.

5. In a control system for a power transmission mechanism capable of delivering driving torque from a throttle valve controlled engine to a driven member, gear elements cooperating to define plural torque delivery paths between said engine and said driven member, separate fluid pressure operated servo means for controlling the relative motion of said gear elements to establish each of two driving speed ratios, a fluid pressure source, conduit structure interconnecting said pressure source and said servo means, fluid pressure distributor valve means disposed in and partly defining said conduit structure for selectively distributing control pressure from said source to each of said servo means, a source of a pressure signal that is related in magnitude to an operating variable, passage means for distributing said signal to said distributor valve means to actuate the same, downshift valve means for overruling the automatic action of said distributor valve means in response to the rate at which accelerating torque is demanded by the operator, a flow restricting orifice in fluid communication with said downshift valve means, the latter being adapted to displace fluid through said orifice upon movement thereof to a position corresponding to the forced downshift position, and an accelerator control valve means responsive to the back pressure produced by said orifice to control distribution of pressure to said downshift valve means when the engine throttle is advanced to an intermediate engine throttle setting.

6. In an automatic power transmission system for an automotive vehicle having an internal combustion engine with a throttle controlled air-fuel mixture intake manifold, a driven member, gear elements cooperating to define plural torque delivery paths from said engine to said driven member, clutch and brake means for controlling the relative motion of said gear elements to establish each of several speed ratios, fluid pressure operated servo means for actuating said clutch and brake means, a fluid pressure source, conduit structure interconnecting said source and said servo means, distributor valve means disposed in and partly defining said conduit structure for controlling distribution of pressure to said servo means to actuate the same selectively, a source of at least one fluid pressure signal that is proportional in magnitude to an operating variable, passage means for distributing said signal to said distributor valve means for actuating the latter, driver controlled downshift valve means including a movable element connected mechanically to said engine throttle valve for overruling the action of said distributor valve means to initiate a downshift from one speed ratio to a relatively low speed ratio, said downshift valve means including branch passages for establishing fluid communication between said distributor valve means and a high pressure portion of said conduit structure, said movable element of said downshift valve means having a connection with the engine throttle and being situated in and partly defining said passages for controlling distribution of a downshift pressure signal to said distributor valve means, a flow restricting orifice in fluid communication with said downshift valve means, the latter being adapted to displace fluid through said orifice upon movement of the movable element thereof to a position corresponding to a forced downshift position, and an accelerator control valve in said passages and responsive to the back pressure produced by said orifice to control distribution of pressure to said downshift valve means when said movable valve element is advanced rapidly to a position that corresponds to an intermediate engine throttle setting.

7. In a power transmission system adapted to deliver power from a throttle controlled internal combustion engine to a driven member, gear elements cooperating to define plural torque delivery paths between said engine and said driven member, clutch and brake means for controlling the relative motion of said gear elements, fluid pressure operated servo means for actuating said clutch and brake means, a fluid pressure source, conduit structure interconnecting said pressure source and said servo means, distributor valve means disposed in and partly defining said conduit structure for controlling distribution of pressure to said servo means, at least one pressure signal source in fluid communication with said distributor valve means for actuating the latter in response to variations in an operating variable, a downshift valve means including a movable valve element for controlling distribution of a downshift pressure signal to said distributor valve means when the engine throttle is advanced to a wide-open setting, a mechanical connection between said valve element and the engine throttle, an accelerator control valve means for distributing a torque demand pressure signal to said distributor valve means for actuating the same in response to a high rate of movement of said valve element toward a wide-open engine throttle position, said accelerator control valve defining in part a fluid passage extending from a high pressure portion of said conduit to said distributor valve means, a fluid connection between said accelerator control valve and said downshift valve means, said movable valve element being adapted to displace fluid from said downshift valve means upon movement thereof toward a wide-open engine throttle position, a precalibrated flow restricting orifice in fluid communication with said connection, the fluid displaced by said valve element passing through said orifice and thereby creating a back pressure, said accelerator control valve being subjected to said back pressure and actuated thereby when the magnitude of said back pressure exceeds a predetermined value, said accelerator control valve in its actuated position being adapted to distribute a torque demand downshift signal to said distributor valve means, a pressure relief valve in fluid communication with said connection, one side of said valve being in fluid communication with a low pressure portion of said conduit structure, said pressure relief valve responding to an excessive pressure buildup across said orifice to produce a bypass flow from said connection to a low pressure region.

8. A control system for an automatic power transmission system for an automotive vehicle drive-line having a throttle controlled internal combustion engine and an air-fuel mixture intake manifold, a driven member, gear elements adapted to establish plural torque delivery paths between said engine and said driven member, clutch and brake means for controlling the relative motion of said gear elements, fluid pressure operated servos for actuating said clutch and brake means, a fluid pressure source, conduit structure interconnecting said pressure source and said servos, fluid pressure distributor valve means situated in and partly defining said conduit structure for controlling the distribution of pressure to said servos thereby initiating selectively speed ratio changes, a source of a pressure signal that is related in magnitude to the driven speed of said driven member, a second fluid pressure signal source for producing a second pressure signal that is related in magnitude to engine intake manifold pressure, said distributor valves being in fluid communication with each pressure signal source, a downshift valve means for overruling the automatic speed ratio tendencies of said distributor valve means including a movable valve element connected mechanically to the engine throttle, a branch passage extending from said second pressure signal source to said distributor valve means, said branch passage being defined in part by said downshift valve means and establishing fluid communication between a portion of said downshift valve means and said second pressure signal source when the engine carburetor throttle is advanced to a wide-open setting, an accelerator control valve, a torque demand downshift pressure passage extending from a high pressure region of said conduit structure to said distributor valve means, said torque demand downshift passage means being defined in part by said accelerator control valve, said accelerator control valve being adapted to interrupt communication through said downshift pressure signal passage means and said distributor valve means when it assumes one position and to establish such communication when it assumes another position, means for normally biasing said accelerator control valve to said one position, a fluid connection between said accelerator control valve and said downshift valve means, the valve element of said downshift valve means being adapted to displace fluid through said connection as it is advanced toward a position corresponding to a wide-open engine throttle setting, a flow restricting orifice situated in and partly defining said connection, said accelerator control valve responding to a back pressure developed by said orifice and movable under the influence of the pressure force produced thereby to said other position when the engine carburetor throttle is moved at a relatively high rate toward the advanced throttle position, and a pressure relief valve in fluid communication with said connection, one side of said valve being in fluid communication with a low pressure portion of said conduit structure, said pressure relief valve responding to an excessive pressure build-up across said orifice to produce a bypass flow from said connection to said low pressure region.

9. In a power transmission system adapted to deliver power from a throttle controlled internal combustion engine to a driven member, gear elements cooperating to define plural torque delivery paths between said engine and said driven member, clutch and brake means for controlling the relative motion of said gear elements, fluid pressure operated servo means for actuating said clutch and brake means, a fluid pressure source, conduit structure interconnecting said pressure source and said servo means, distributor valve means disposed in and partly defining said conduit structure for controlling distribution of pressure to said servo means, at least one pressure signal source in fluid communication with said distributor valve means for actuating the latter in response to variations in an operating variable, a downshift valve means including a movable valve element for controlling distribution of a downshift pressure signal to said distributor valve means when the engine throttle is advanced to a wide-open setting, a mechanical connection between said valve element and the engine throttle, an accelerator control valve means for distributing a torque demand pressure signal to said distributor valve means for actuating the same in response to a high rate of movement of said valve element toward a wide-open engine throttle position, said accelerator control valve defining in part a fluid passage extending from a high pressure portion of said conduit to said distributor valve means, a fluid connection between said accelerator control valve and said downshift valve means, said movable valve element being adapted to displace fluid from said downshift valve means upon movement thereof toward a wide-open engine throttle position, a precalibrated flow restricting orifice in fluid communication with said connection, the fluid displaced by said valve element passing through said orifice and thereby creating a back pressure, said accelerator control valve being subjected to said back pressure and actuated thereby when the magnitude of said back pressure exceeds a predetermined value, said accelerator control valve in its actuated position being adapted to distribute a torque demand downshift signal to said distributor valve means, a pressure relief valve in fluid communication with said connection, one side of said valve being in fluid communication with a low pressure portion of said conduit structure, said pressure relief valve responding to an excessive pressure build-up across said orifice to produce a bypass flow from said connection to a low pressure region, and a one-way check valve providing one-way communication between said connection and said low pressure region, said check valve being in parallel disposition with respect to said relief valve and adapted to establish return flow from said low pressure region to said downshift valve as said valve element is retracted to a position corresponding to a reduced engine throttle setting.

10. A control system for an automatic power transmission system for an automotive vehicle driveline having a throttle controlled internal combustion engine and an air-fuel mixture intake manifold, a driven member, gear elements adapted to establish plural torque delivery paths between said engine and said driven member, clutch and brake means for controlling the relative motion of said gear elements, fluid pressure operated servos for actuating said clutch and brake means, a fluid pressure source, conduit structure interconnecting said pressure source and said servos, fluid pressure distributor valve means situated in and partly defining said conduit structure for controlling the distribution of pressure to said servos thereby initiating selectively speed ratio changes, a source of a pressure signal that is related in magnitude to the driven speed of said driven member, a second fluid pressure signal source for producing a second pressure signal that is related in magnitude to engine intake manifold pressure, said distributor valves being in fluid communication with each pressure signal source, a downshift valve means for overruling the automatic speed ratio tendencies of said distributor valve means including a movable valve element connected mechanically to the engine throttle, a branch passage extending said second pressure signal source to said distributor valve means, said branch passage being defined in part by said downshift valve means and establishing fluid communication between a portion of said downshift valve means and said second pressure signal source when the engine carburetor throttle is advanced to a wide-open setting, an accelerator control valve, a torque demand downshift pressure passage extending from a high pressure region of said conduit structure to said distributor valve means, said torque demand downshift passage means being defined in part by said accelerator control valve, said accelerator control valve being adaped to interrupt communication through said downshift pressure signal passage means and said distributor valve means when it assumes one position and to establish such communication when it assumes another position, means for normally biasing said accelerator control valve to said one position, a fluid connection between said accelerator control valve and said downshift valve means, said valve element of said downshift valve means being adapted to displace fluid through said connection as it is advanced toward a position corresponding to the wide-open engine throttle setting, a flow restricting orifice situated in and partly defining said connection, said accelerator control valve responding to a back pressure developed by said orifice and movable under the influence of the pressure force produced thereby to said other position when the engine carburetor throttle is moved at a relatively high rate toward the advanced throttle position, a pressure relief valve in fluid communication with said connection, one side of said valve being in fluid communication with a low pressure portion of said conduit structure, said pressure relief valve responding to an excessive pressure build-up across said orifice to produce a bypass flow from said connection to said low pressure region, and a one-way check valve providing one-way communication between said connection and said low pressure region, said check valve being in parallel disposition with respect to said relief valve and adapted to establish return flow from said low pressure region to said downshift valve as said valve element is retracted to a position corresponding to a reduced engine throttle setting.

11. A conrol valve system for a multiple speed ratio power transmission mechanism adapted to deliver driving torque from a throttle valve controlled engine to a driven member, gear elements defining plural torque delivery paths between said engine and said driven member, fluid pressure operated servo means for controlling the relative motion of said gear elements to establish speed ratio changes, a fluid pressure source, conduit structure interconnecting said source and said servo means, fluid pressure distributor valve means for controlling distribution of fluid pressure from said source to said servos, a source of a pressure signal, passage means for distributing said signal to said distributor valve means to effect automatic operation thereof, personally operated forced downshift valve means in fluid communication with a high pressure region of said conduit structure and said distributor valve means for overruling the automatic ratio shifting tendencies of said distributor valve means while effecting a ratio change from one speed ratio to a lower speed ratio upon movement of the engine throttle to an advanced setting, and torque demand downshift valve means communicating with a high pressure region of said conduit structure and with said distributor valve means for transmitting to said distributor valve means a valve actuating pressure signal for overruling the automatic ratio shifting tendencies of said distributor valve means while effecting a ratio change from one speed ratio to a lower speed ratio upon movement of the engine throttle at an advanced rate toward said advanced setting.

12. A control valve system for a multiple speed ratio power transmission mechanism adapted to deliver driving torque from a throttle valve controlled engine to a driven member, gear elements defining plural torque delivery paths between said engine and said driven member, fluid pressure operated servo means for controlling the relative motion of said gear elements to establish speed ratio changes, a fluid pressure source, conduit structure interconnecting said source and said servo means, fluid pressure distributor valve means for controlling distribution of fluid pressure from said source to said servos, a source of a pressure signal, passage means for distributing said signal to said distributor valve means to effect automatic operation thereof, and torque demand downshift valve means communicating with a high pressure region of said conduit structure and said valve means for overruling the automatic ratio shifting tendencies of said distribtuor valve means while effecting a ratio change from one speed ratio to a lower speed ratio upon movement of the engine throttle at an advanced rate toward said advanced setting, said downshift valve means comprising a personally operable fluid piston, a fluid cylinder receiving said piston and defining therewith a pressure cavity, an accelerator control valve, a control pressure conduit communicating with and partly defined by said accelerator control valve and extending to said pressure source, a fluid connection between said cavity and said accelerator control valve to distribute to the latter an actuating pressure and to shift the same from a pressure conduit blocking position to a pressure conduit opening position as the pressure in said cavity is increased upon movement of said piston.

References Cited by the Examiner

UNITED STATES PATENTS

| | | | |
|---|---|---|---|
| 2,530,753 | 11/1950 | Banker | 74—472.4 |
| 2,766,639 | 10/1956 | Rosenberger | 74—472.1 |

DONLEY J. STOCKING, *Primary Examiner.*

LAURENCE V. EFNER, *Examiner.*